United States Patent
Cho et al.

(10) Patent No.: US 7,995,925 B2
(45) Date of Patent: Aug. 9, 2011

(54) OPTICAL RECEIVER USING BEAM COMBINING AND SYSTEM USING THE SAME

(75) Inventors: Pak Shing Cho, Gaithersburg, MD (US); Isaac Shpantzer, Bethesda, MD (US); Jacob Khurgin, Baltimore, MD (US)

(73) Assignee: CeLight, Inc., Silver Spring, MD (US)

( * ) Notice: Subject to any disclaimer, the term of this patent is extended or adjusted under 35 U.S.C. 154(b) by 157 days.

(21) Appl. No.: 12/371,249

(22) Filed: Feb. 13, 2009

(65) Prior Publication Data

US 2009/0169221 A1 Jul. 2, 2009

Related U.S. Application Data

(63) Continuation-in-part of application No. 11/695,920, filed on Apr. 3, 2007, now Pat. No. 7,715,720, and a continuation-in-part of application No. 12/331,164, filed on Dec. 9, 2008, and a continuation-in-part of application No. 12/137,352, filed on Jun. 11, 2008, each which is a continuation-in-part of application No. 10/669,130, filed on Sep. 22, 2003, now Pat. No. 7,327,913, and a continuation-in-part of application No. 11/610,964, filed on Dec. 14, 2006, now Pat. No. 7,397,979, and a continuation-in-part of application No. 11/672,372, filed on Feb. 7, 2007.

(60) Provisional application No. 61/090,404, filed on Aug. 20, 2008.

(51) Int. Cl.
*G02B 6/26* (2006.01)
*H04B 10/06* (2006.01)
*H04B 10/00* (2006.01)

(52) U.S. Cl. ........ 398/118; 398/209; 398/212; 398/214; 385/15

(58) Field of Classification Search .......... 398/206–210, 398/212–214
See application file for complete search history.

(56) References Cited

U.S. PATENT DOCUMENTS

| | | | | |
|---|---|---|---|---|
| 5,245,681 A | * | 9/1993 | Guignard et al. | 385/16 |
| 5,323,258 A | * | 6/1994 | Tsushima et al. | 398/203 |
| 5,691,832 A | * | 11/1997 | Liedenbaum et al. | 398/43 |
| 5,946,130 A | * | 8/1999 | Rice | 359/349 |
| 6,882,781 B2 | * | 4/2005 | Ionov | 385/48 |
| 2003/0090765 A1 | * | 5/2003 | Neff et al. | 359/172 |
| 2007/0047954 A1 | * | 3/2007 | Mamyshev | 398/33 |
| 2009/0034967 A1 | * | 2/2009 | Tao et al. | 398/33 |
| 2009/0279902 A1 | * | 11/2009 | Granot et al. | 398/208 |

* cited by examiner

*Primary Examiner* — Uyen Chau N Le
*Assistant Examiner* — Chris Chu
(74) *Attorney, Agent, or Firm* — Nadya Reingand

(57) ABSTRACT

An optical beam combiner is provided, which allows efficient collection of light for various applications: non-line of sight and free space optical communications, remote sensing, optical imaging and others. A multitude of transverse scattered optical beam portions is captured by the multi-aperture array positioned perpendicular to the beam projection direction. These beam portions are combined first into a single optical waveguide with minimal loss of power. This is achieved by modulating the beam portions phase and coupling ratio of couplers in the optical beam combiner tuned to maximize the final output power. The data is recovered from the received optical beam using coherent detection.

20 Claims, 5 Drawing Sheets

(a)

Side View (b)

(c)

OPTICAL RECEIVER USING BEAM COMBINING AND SYSTEM USING THE SAME

CROSS-REFERENCE TO RELATED APPLICATIONS

This application claims priority of provisional Application Ser. No. 61/090,404 filed Aug. 20, 2008. It is also a continuation-in-part of U.S. patent application Ser. No. 11/695,920 filed Apr. 3, 2007 now U.S. Pat. No. 7,715,720; Ser. No. 12/137,352 filed Jun. 11, 2008, Ser. No. 12/331,164 filed Dec. 9, 2008, which are continuation-in-part applications of U.S. Ser. No. 10/669,130 filed Sep. 22, 2003 now U.S. Pat. No. 7,327,913, Ser. No. 11/610,964 filed Dec. 14, 2006 now U.S. Pat. No. 7,397,979, Ser. No. 11/672,372 filed Feb. 7, 2007, all of which applications are fully incorporated herein by reference.

FIELD OF THE INVENTION

This invention relates generally to laser systems and methods of receiving at least a portion of the laser beam after its transmission through scattering media. The system includes an optical combiner for receiving at least portions of the scattered beam, combining them together and recovering data encoded in the beam. The applications comprise non-line of sight optical communications (NLOS), free space optical communications, remote sensing, optical imaging and others.

BACKGROUND OF THE INVENTION

In this invention we disclose an optical signal receiver with improved light collection means in view of non-line of sight communication systems, however this approach is applicable for variety of other arrangements: laser radars, remote sensing equipment, satellite communications, line-of-sight free space communication systems and others.

Secure laser communications through the atmosphere with non-line-of-sight (NLOS) reception capabilities are of great interests for commercial links and for military applications. Optical scattering in the atmosphere (Rayleigh and Mie) by gas molecules and aerosols provides the fundamental mean that enables NLOS communications. Reception of the laser signal, however, is challenging because of the small number of scattered photons that make their ways to the receiver and also a substantial solar background radiation that mask the signal light. Space-diversity via multiple aperture reception is an effective technique to mitigate the photon-starved transmission. Conventional space-diversity receiver combines multitude of electronic signals from multiple photoreceivers positioned along the projection of the transmission path of the optical beam. Each photoreceiver add its own thermal and dark current noise to the signal independently such that the overall noise grows as the number of photoreceiver. Furthermore, the complexity of the electronics and power dissipation increases as well.

There is a need for an efficient solution for the low intensity optical beam receiving in the systems with laser beam propagation through the atmosphere.

SUMMARY OF THE INVENTION

Accordingly, an object of the present invention is to provide an optical device that provides compensating of phase and power non-uniformity across the optical beam caused by the turbulence. An optical device has $2^M$ input waveguides (M is integer $\geq 2$), each receiving a portion of the incoming optical beam. The waveguides are connected by $(2^M-1)$ couplers forming a tree-like structure; each coupler is formed by two waveguides, coming in and out of the coupler. In each coupler the output of one output waveguide is used in control means for changing an input phase of the optical beam portion in the same waveguide before its coupling and for changing the coupling ratio of the coupler. Another output waveguide forms an input waveguide for a consequent coupler from $(2^M-1)$ couplers. A final output waveguide from the last coupler is a final output beam of the device. The control means change the phases of the beams propagating in the waveguides before their coupling and the coupling ratio of the coupler. This change aims to maximize the final output beam power. The control means may include photodetectors receiving beams in the output waveguide from every coupler, producing an electrical signal being used to change the input phase of the optical beam portion in the same waveguide before its coupling and to change the coupling ratio of the coupler. The input phase is changed in a phase modulator connected to the same waveguide before coupling. The control means include a digital signal processing unit.

The output signal from the device can be detected and used for further processing, information recovery and display. The device may also include an optical receiver to detect the output beam. In the preferred embodiment this signal is received by a coherent optical receiver. In the coherent receiver it is combined with a local oscillator beam. In one embodiment the receiving beam and the local oscillator beam interfere in a 90-degrees optical hybrid and the output signals are processed by a set of balanced photodetectors.

Another object of the present invention is to provide an integrated single monolithic adjustable device to perform this operation. However the description is provided of any kind of device: integrated device, a free-space optical link device, and a fiber optics device. In the preferred embodiment the integrated device is a chip made of $LiNbO_3$ material.

Yet another object of the present invention is to provide a system and method for information recovery, which can find applications in optical communications, remote sensing, optical imaging and other fields. The receiving unit includes an optical beam combiner with a set of input waveguides, each receiving a portion of incoming optical beam. $2^M$ inputs of the combiner interfere with each other via a system of tunable coupled waveguides. The phases and the coupling ratios in interleaved waveguides of the combiner are adjusted to maximize the resulting output signal. The combiner may be used for coherent communication in combination with a balanced 90° hybrid. The receiving unit may be located as far as 2000 meters from the transmitter. The transmitter may include a light source that generates multiple wavelengths in the UV, optical or infrared ranges.

DETAILED DESCRIPTION OF THE PREFERRED EMBODIMENT

The present invention now will be described more fully hereinafter with reference to the accompanying drawings, in which the preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

NLOS communications requires very sensitive receiving system, because of the small number of scattered photons that make their ways to the receiver and also a substantial solar background radiation that mask the signal light. Space-diversity via multiple aperture reception is an effective technique to mitigate the photon-starved transmission. An all-optical approach is disclosed here wherein multitude of transverse scattered optical beams captured by the multi-aperture array are combined first into a single optical waveguide with minimal loss of power before coherent detection. This is possible utilizing the fact that the transverse scattered beam path length difference is much smaller than longitudinal scattered path length difference at the receiver array. This arrangement concerns a space-diversity optical receiver utilizing such optical beam combining for NLOS laser communications.

Figure 1:
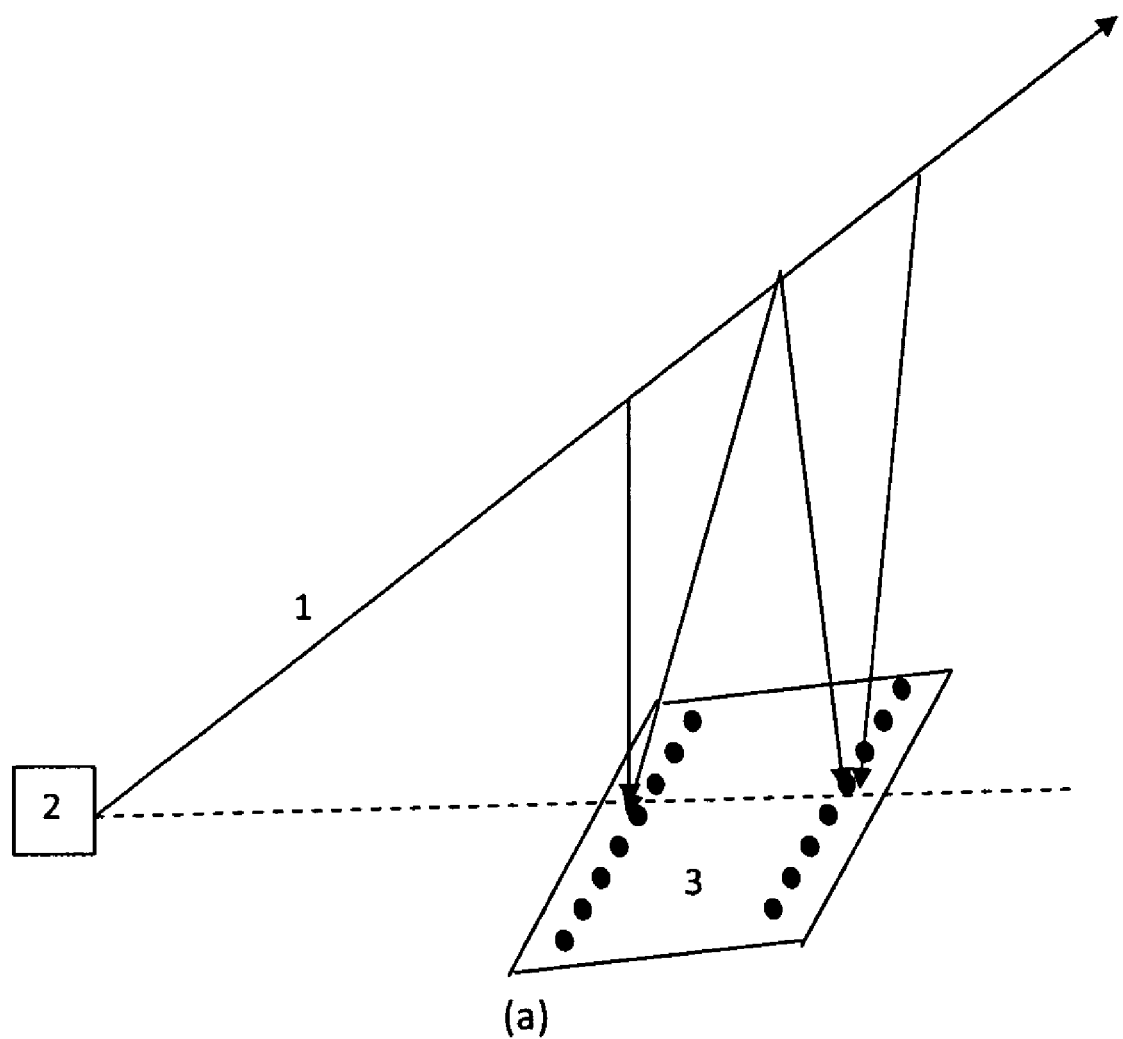
FIG. 1 (a) schematic of a NLOS link with transverse position of the detector arrays; (b) a NLOS link with a two-dimensional 8×8 array receiver for reception of scattered light from the main laser beam; (c) schematics illustrates two possible scattered beam collected by a single elements; only two sets of scattered beams are shown for clarity FIG. 2 Top view of a schematic of a NLOS link with a two-dimensional 8×8 array receiver for reception of scattered light from the main laser beam.
Figure 1:
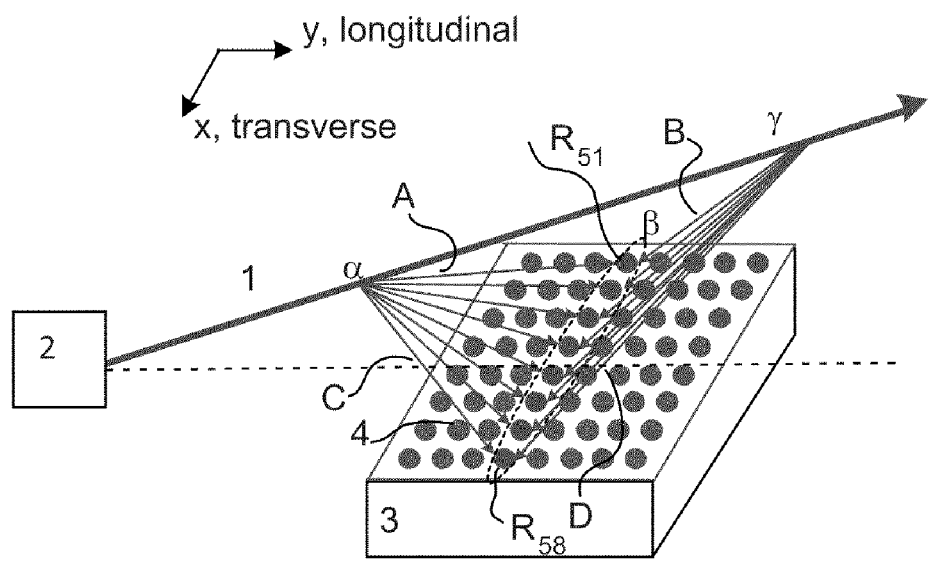
Figure 1:
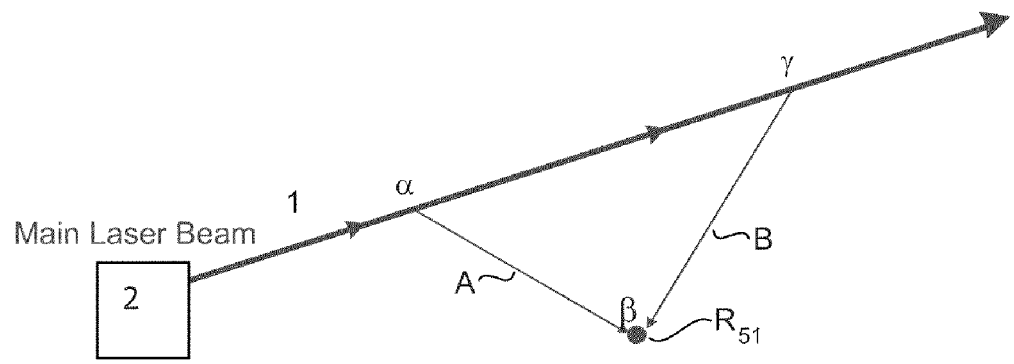
Figure 2:
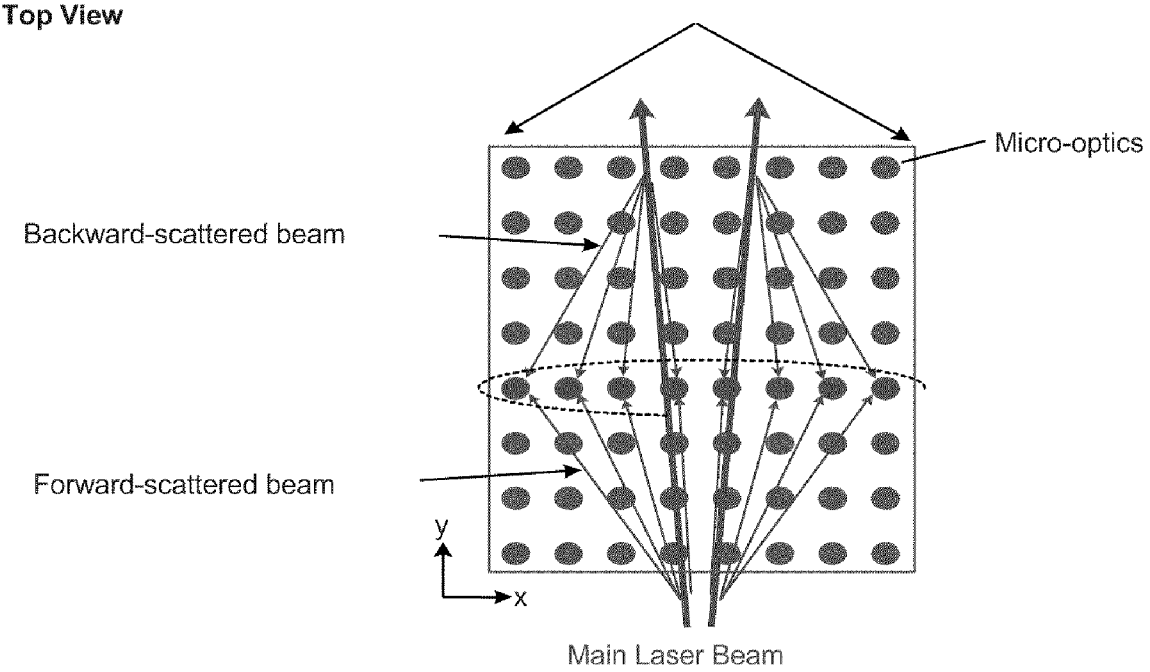
Figure 3:
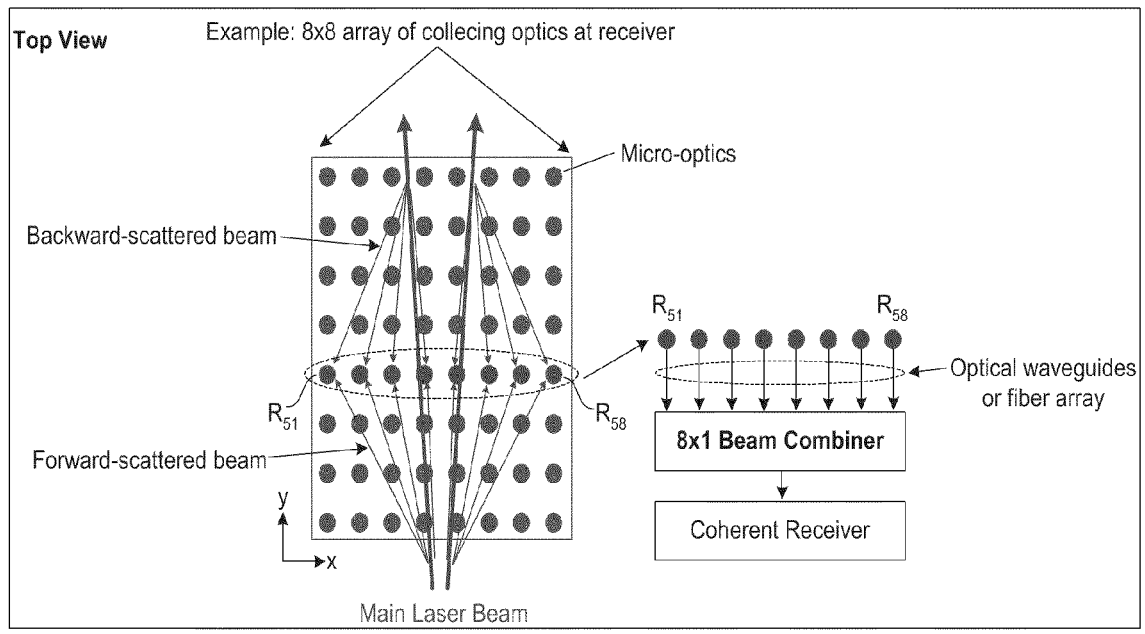
FIG. 3. Top view of a schematic of a two-dimensional 8×8 array receiver for reception of scattered light from the main laser beam, showing how the signals from the row of detectors R51-R58 are combined together and inserted in a coherent receiver.
Figure 4:
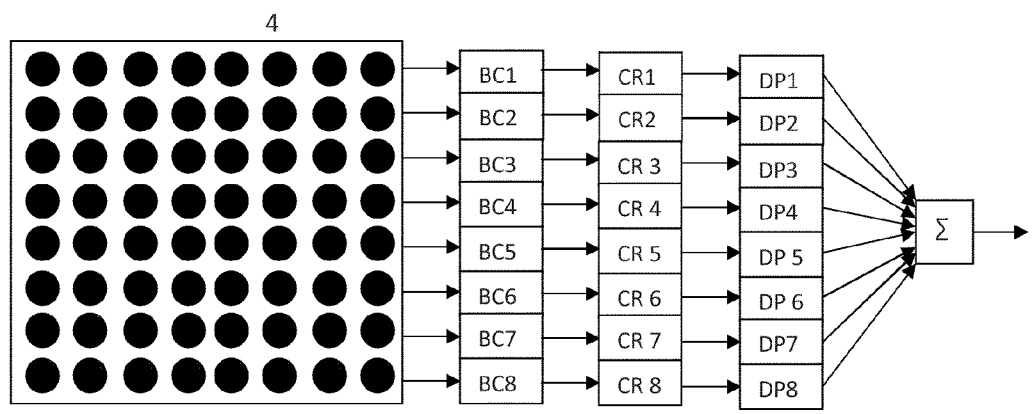
FIG. 4 Example of an 8×8 receiver array with beam combiner for each row connected to a coherence receiver followed by DSP producing an output signal.

FIG. 1(a) depicts a schematic of a NLOS link with the proposed receiver. Information-bearing laser beam 1 from a transmitter 2 propagates through the atmosphere at an elevated angle. In the preferred embodiment rows of a receiver 3 points in a direction normal to the projection of the beam propagation. The receiver collects portions of scattered light from a range of directions determined by the field-of-view (FOV) of the receiver. The proposed space-diversity receiver 3 includes a two-dimensional array of micro-optics that collects and focuses light into an array of single-mode optical waveguides such as optical fibers, not shown in the figure but will be described later. Examples of the micro-optics array include but not limited to fiber collimator arrays available from MEMS Optical, Inc., Huntsville, Ala. or microlens arrays fabricated by Heptagon USA, Inc., San Jose, Calif. An example of an 8×8 array is depicted in FIG. 1 FIG. 1 (b), however any number of microlenses in the array is possible. The micro-optics elements are arranged in the longitudinal (y) and transverse (x) directions relative to the direction of the beam projected horizontally as shown in FIG. 1 FIG. 1 (b).

For the purpose of illustration, we consider a single row of the array in the transverse direction (x), for example, row #5 with elements 1 to 8 enclosed in the dashed line shown. The receiver element $R_{51}$ collects scattered beams A and B within its FOV limit. As shown in FIG. 1 FIG. 1(c), the scattered beam A might arrive at the element $R_{51}$ via path $\alpha\beta$ while scattered beam B might arrive at the element $R_{51}$ via path $\alpha\gamma\beta$.

Note that there are many other possible scattered beams that can be collected by element $R_{51}$ between points $\alpha$ and $\gamma$. The length difference between these two paths will be substantially larger than the symbol length (e.g., 3 m) of the transmitted data for applicable transmitter-receiver distance (e.g., 1 km). The path length is determined by the FOV of the element, transmitter-receiver distance, and elevation of the main laser beam among other parameters. An arrival time delay $\tau_{51}$ between the two scattered beams from the point $\alpha$ related to the path length difference can be identified which can be substantially larger than the symbol period (e.g. 10 ns). A similar time delay $\tau_{58}$ can be defined for the receiver element $R_{58}$ collecting scattered beams C and D, for example.

Even though both $\tau_{51}$ and $\tau_{58}$ can be large the absolute difference between them, however, is relatively small. In fact, the following relations is expected $$\frac{|\tau_{ij} - \tau_{ik}|}{\tau_{im}} \ll 1, j \neq k,$$

where i denotes the row number in the longitudinal (y) direction while j, k, and m are the column indices in the transverse (x) direction. This can be readily seen in Error! Reference source not found. depicting the top view of the NLOS link and the receiver. Because of the limited size of the receiver aperture, the path length difference between adjacent elements in the transverse (x) direction is much smaller than a symbol length. Take, for example, a 100 MSymbol per second signal where the symbol length is 3 m (10 ns). To produce a maximum delay of 10 ns between two furthest apart elements in the same row would require the receiver to be almost 3 m wide. Typical receiver array dimension is expected to be in the range of 10 cm or less (~0.3 ns delay) which is negligible compared with the symbol period.

Because of this property one can optically combine the light power collected by all the elements in the same row or in the transverse direction without temporal compensation or alignment of the optical symbol in the collected scattered beams from each element in the row before detection. For each row of the receiver aperture array, a beam combiner is used to optically sum the light power collected from each elements in that row. The optical sum is possible because the scattered beam path difference in the transverse direction is significantly smaller than a symbol length (10 ns). As shown in Error! Reference source not found. 3, an 8×1 optical beam combiner with eight inputs connected to eight elements in the same row of the receiver array optically sum the light power before coherent detection. Error! Reference source not found. 4 shows schematic of the architecture of the overall receiver 3 for an 8×8 receiver array 4. A set of beam combiners (BC1-BC8) followed by a set of coherent receivers (CR1-CR8) are connected to the array. Signal from each of the eight coherent receiver outputs are digitally processed via a DSP unit (one unit from the set of DP1-DP8) to realign the symbols in time before summation $\Sigma$. Recovered data can be obtained after applying data-recovery DSP to the summed signal. A schematic of an 8×1 optical beam combiner was previously described in the U.S. patent application Ser. No. 12/331,164 filed Dec. 9, 2008 by the same inventive entity, which is fully incorporated herein by reference.

In the preferred embodiment the generalized M-stage beam combiner includes $2^M$ inputs, where M is integer. The combiner shown in FIG. 5 has 8 inputs as an example. In the preferred embodiment the interface optical unit includes focusing lenses $R_{51}$-$R_{58}$ and a bundle of optical fibers. In one embodiment, the focusing optics can be cylindrical.

All optical beams entering the inputs 11-18 have different powers. The combiner has seven directional couplers 21-27 with two output branches each, where one output branch 31-37 of each coupler serves for control. The operation of each stage is the following. The waveguides 11*a* and 12*a* are coupled together by a coupler 21. The signal from the output 31 is detected by a first detector D1. The power detected by the detector D1 is minimized by applying a correction signal 41 via electronic unit 51 to the phase modulator 61 that changes the phase of the signal in the input waveguide 11*a* until it is shifted by exactly 90 degrees from the signal in the waveguide 12*a*. When the phase shift is equal to 90 degrees, a constructive interference occurs in the upper lower branch 31*a* and a destructive in the upper one 31.

Figure 5:
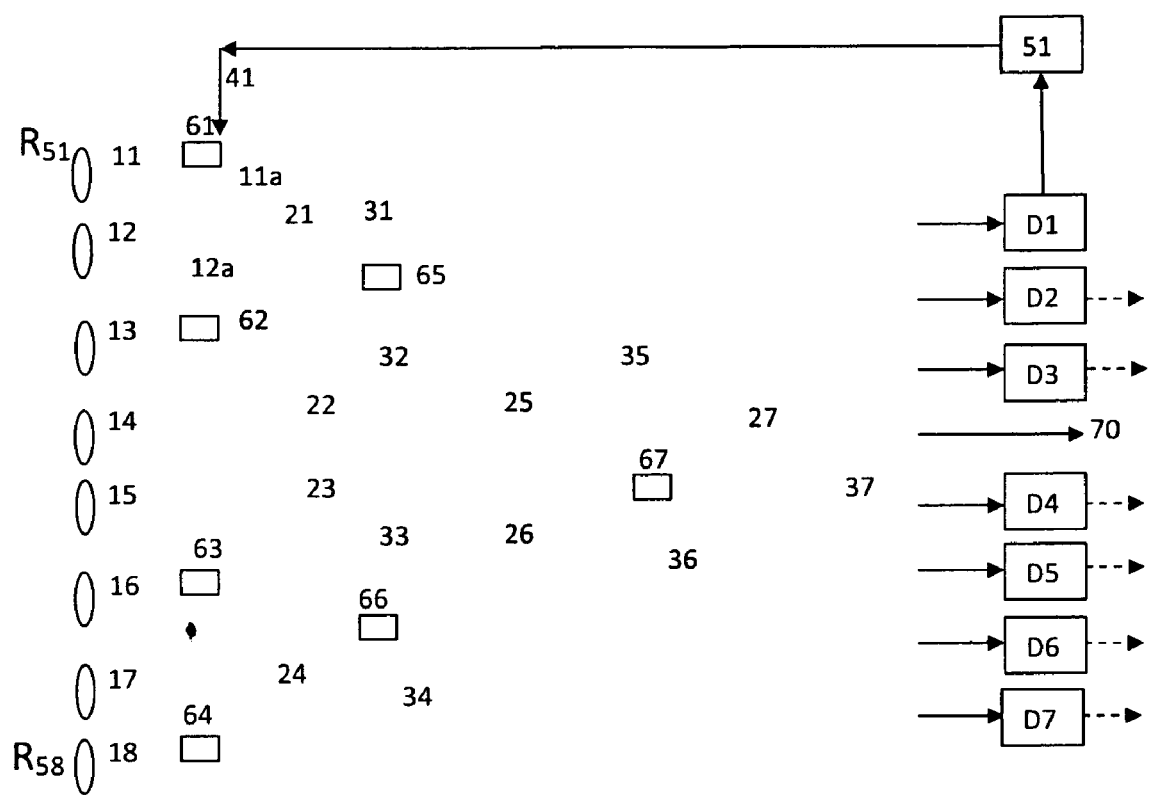
FIG. 5 An 8×1 optical beam combiner with a feedback control loop for maximizing the combined output power via adjustment of the phase shifters and couplers.

It is beneficial to have phase modulators in both upper and lower coupled waveguides, for example, 11*a* and 12*a*, etc. In this case push-pull modulators can be used. However, in principle, the same phase shift can be achieved by implementing only one modulator in one of the branches as shown in FIG. 5.

Other phase modulators 62-68 are controlled in the similar manner by correction signals from detectors D2-D8. The output signal 70 is maximized as a result of this procedure. This procedure is disclosed in more details in U.S. patent application Ser. No. 12/331,164 by the same inventors.

When the constructive interference is achieved, the output of the coupler (m,n) becomes $$P_{out}^{(m,n)} = \frac{1}{2}P_{in,1}^{(m,n)} + \frac{1}{2}P_{in,2}^{(m,n)} + \sqrt{P_{in,1}^{(m,n)} P_{in,2}^{(m,n)}}$$
$$= P_{in,1}^{(m,n)} + P_{in,2}^{(m,n)} - \frac{1}{2}\left(\sqrt{P_{in,1}^{(m,n)}} - \sqrt{P_{in,2}^{(m,n)}}\right)^2$$

The output signal 70 serves for the further processing, for example, for recovery of the information encoded in the beam via coherent detection as described in U.S. patent application Ser. No. 12/331,164 filed Aug. 20, 2008, owned by the same company as the present invention. In the preferred embodiment the combiner is a part of a coherent optical receiver with 90-degrees optical hybrid such as described in U.S. patent application Ser. No. 10/695,920 filed Apr. 3, 2007 and owned by the same company as the present invention, which is fully incorporated herein by reference.

The correction signal may also serve to adjust coupling ratio of all couplers. By adaptively adjusting the phase modulators and the coupling ratios of the coupler an improved power combining efficiency is obtained compared with the phase-only fixed 50/50 coupling combiner where the coupling ratios of all the couplers are fixed at 50/50. Modeling result shows that adjustment of both the phases and coupling ratios of the combiner couplers allows achieving 100% power combining efficiency regardless of the number of inputs and the distribution of the input powers. This is in sharp contrast to the phase-only fixed 50/50 coupling combiner where the power combining efficiency is always less than 100% and it is dependent on the number of inputs and the distribution of the input powers. A 100% power combining efficiency of the phase-only fixed 50/50 coupling combiner can be achieved if and only if all the input powers are exactly equal.

Figure 6:
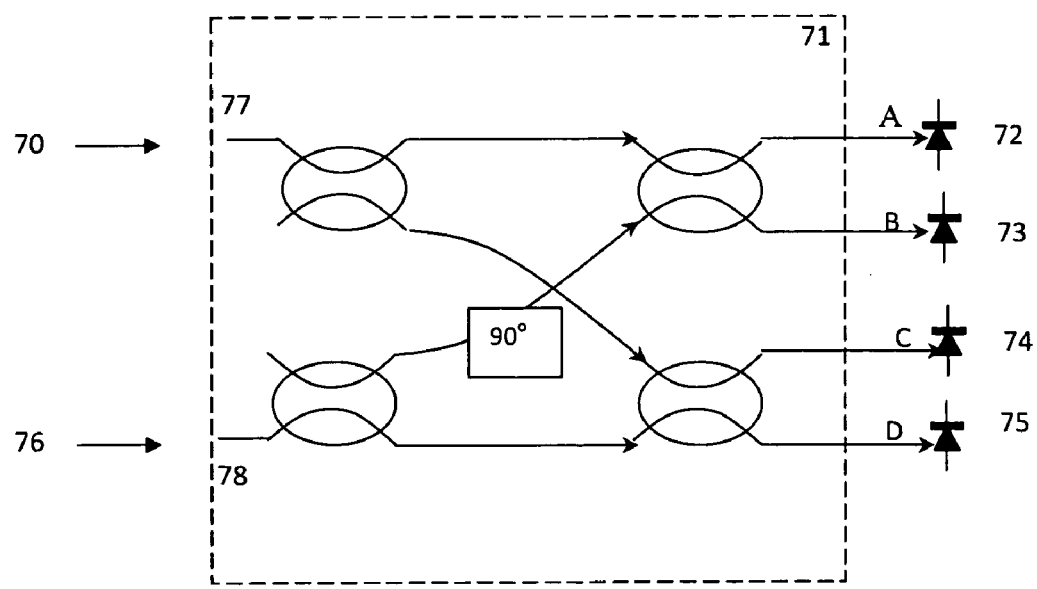
FIG. 6 A schematic of a coherent receiver of the present invention.

Examples of material platform for the integrated beam combiner are: lithium niobate, III-V semiconductors such as InP, InGaAs, GaAs for IR wavelength. For UV/violet applications, semiconductor passive waveguide with low absorption in the 400-nm range can be utilized such as SiC, GaN, and AlxGa1-xN alloys. The schematic diagram of the coherent detector is shown in FIG. 6. In one embodiment, it consists of a 90-degrees optical hybrid 71 and four balanced photodetectors 72-75. Two incoming optical signals 70 and 76, called, respectively, the signal S and the local oscillator L, impinge two inputs 77 and 78 of the optical hybrid. Both signal beam S and local oscillator L beam are divided by the first set of 3 dB couplers and mixed together with an additional phase shift of 90 degrees. The resulting four output signals A, B, C, D, all have 90 degrees relative phase difference of the form: A=S+L, B=S−L, C=S+jL and D=S−jL.

In the preferred embodiment the coherent detector is used as described in the U.S. patent application Ser. No. 10/669,130 "Optical coherent detector and optical communications system and method" by the same team inventors incorporated herein by reference.

The coherent detector performs homodyne or self homodyne detection of the received signal.

In one embodiment the light source generates a pulsed optical signal.

In the preferred embodiment the data is transmitted using Orthogonal Frequency Division Multiplexed (OFDM) communications as disclosed by the same team of inventors in U.S. patent application Ser. No. 12/137,352 filed Jun. 11, 2008.

Main advantages of the proposed technique using beam combiner to sum the transverse scattered beam are: (1) reduced number of high-speed photodetectors and electronics, (2) all the opto-electronics such as photodetectors, amplifiers, ADC do not have to be co-located with the receiver aperture array optics. Smaller number of high-speed photodetectors and electronics reduces the amount thermal noise added to the signal improving the signal-to-noise ratio. Furthermore, power, size, and weight requirements are significantly reduced. Because of the flexibility using optical fiber array, the opto-electronics components can be placed far away the receiver aperture if desired. This is an important feature especially when there is a constraint in space where the receiver aperture is located (e.g., aircraft or submarine).

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An optical device for an optical beam receiving, comprising: $2^M$ optical elements, where M is integer $\geq 2$, receiving portions of the optical beam;

the optical elements forming a one-dimensional array positioned perpendicular to the projection of the optical beam propagation direction; $2^M$ input waveguides being connected to the optical elements;

wherein the incoming optical beam wavefront is spatially divided into I sections across the wavefront each $i^{th}$ section has its own phase $\phi_i$ depending on $i^{th}$ optical path from a transmitter to the optical device, wherein $2 \leq i \leq I$; each $i^{th}$ input waveguide receives $i^{th}$ portion of the optical beam from $i^{th}$ section across the beam wavefront;

$(2^M-1)$ couplers; each coupler is formed by two waveguides, coming in and out of the coupler; control means for changing an input phase of the optical beam portion before its coupling; and one output waveguide forming an input waveguide for a consequent optical coupler from ($2^M-1$) couplers; a final output waveguide from the last coupler guiding a final output beam of the device; and wherein the control means change the input phases to maximize the final output beam power.

2. The device of claim 1, wherein the control means include a control photodetector receiving a beam in the output waveguide from the corresponding coupler, producing an electrical signal being used to change the input phase of the $i^{th}$ optical beam portion in the same waveguide before its coupling.

3. The device of claim 2, wherein the input phase is changed in a phase modulator connected to the same waveguide before coupling.

4. The device of claim 2, wherein the input phase change leads to minimization of the power of the beam receiving by the control photodetector in order to achieve maximized signal in the other output waveguide from the same coupler.

5. The device of claim 2, further comprising the electrical signal being used to change the coupling ratio of the corresponding coupler to maximize the final output beam power.

6. The device of claim 1, wherein the control means include a digital signal processing unit.

7. The device of claim 1, further comprising: an optical receiver to detect the output beam.

8. The device of claim 7, wherein the receiver is a coherent optical receiver.

9. The device of claim 8, further comprising:
a local oscillator, and wherein the receiver is based on a 90-degrees optical hybrid;
the hybrid receiving and mixing the output beam of the device and a local oscillator beam, providing four hybrid output beams; and the hybrid output beams being used to recover information encoded in the optical beam.

10. The device of claim 1, wherein the device is selected from at least one of, an integrated device, a free-space optical link device, and a fiber optics device.

11. The device of claim 1 being used in an optical communications system, laser radar or chemical sensing system.

12. An non-line of sight optical communication system, comprising:
a transmitter sending an information bearing light beam through the atmosphere at an elevated angle;
a receiving unit, receiving a light scattered on atmospheric inhomogeneities along the beam propagation; the receiving unit including a device for the beam receiving; the device comprising
$2^M$ optical elements, where M is integer $\geq 2$, receiving portions of the optical beam;
the optical elements forming a one-dimensional array positioned perpendicular to the projection of the optical beam propagation direction;
$2^M$ input waveguides being connected to the optical elements;
wherein the incoming optical beam wavefront is spatially divided into I sections across the wavefront each section has its own phase $\phi_i$ depending on $i^{th}$ optical path from a transmitter to the optical device, wherein $2 \leq i \leq I$; each $i^{th}$ input waveguide receives $i^{th}$ portion of the optical beam from $i^{th}$ section across the beam wavefront;
($2^M-1$) couplers; each coupler is formed by two waveguides, coming in and out of the coupler;
control means for
changing an input phase of the $i^{th}$ optical beam portion before its coupling; and
one output waveguide forming an input waveguide for a consequent optical coupler from ($2^M-1$) couplers; a final output waveguide from the last coupler guiding a final output beam of the device; and
wherein the control means changing the input phases to maximize the final output beam power.

13. The system of claim 12, the control means include a control photodetector receiving a beam in the output waveguide of the corresponding coupler, producing an electrical signal being used to change the input phase of the optical beam portion in the same waveguide before its coupling; the input phase is changed in a phase modulator connected to the same waveguide before coupling.

14. The system of claim 13, wherein the input phase change leads to minimization of the power of beam receiving by the control photodetector in order to achieve maximized signal in the other output waveguide from the same coupler.

15. The system of claim 13, wherein the electrical signal controls the coupling ratio of the coupler to maximize of the final output beam power.

16. The system of claim 12, wherein the receiving unit is positioned at least 1-2000 meters from the transmitter.

17. The system of claim 12, wherein the light source generates a spectrum of wavelengths in the ultraviolet, optical or infrared ranges.

18. A method of non-line of sight data transmission, comprising:
sending an information bearing light beam through the atmosphere at an elevated angle;
receiving portions of a light scattered on atmospheric inhomogeneities along the beam propagation by $2^M$ optical elements, where M is integer $\geq 2$; the optical elements forming a one-dimensional array positioned perpendicular to the projection of the beam propagation direction;
wherein the incoming optical beam wavefront is spatially divided into I sections across the wavefront each section has its own phase $\phi_i$ depending on $i^{th}$ optical path from a transmitter to the optical device, wherein $2 \leq i \leq I$; each $i^{th}$ input waveguide receives portion of the optical beam from section across the beam wavefront;
inserting the received portions of light into $2^M$ input waveguides being connected to the optical elements;
coupling each pair of adjacent waveguides; each coupler is formed by two waveguides, coming in and out of the coupler;
control means change an input phase of the $i^{th}$ optical beam portion before its coupling; one output waveguide forming an input waveguide for a consequent optical coupler from ($2^M-1$) couplers; an output waveguide from the last coupler guiding a final output beam of the device; and
wherein the control means change the input phases to maximize the final output beam power.

19. The method of claim 18, further comprising:
receiving the output beam by a coherent receiver.

20. The method of claim 19, wherein the coherent receiver is based on 90-degreed optical hybrid.

* * * * *